(12) United States Patent
Muquet et al.

(10) Patent No.: US 8,509,131 B2
(45) Date of Patent: Aug. 13, 2013

(54) TILE ALLOCATION METHOD

(75) Inventors: Bertrand Muquet, Saint Germain en Laye (FR); Amélie Duchesne, Paris (FR); Fabien Buda, Paris (FR); Bertrand Debray, Maisons Laffite (FR)

(73) Assignee: Sequans Communications, Paris la Defense Cedex (FR)

( * ) Notice: Subject to any disclaimer, the term of this patent is extended or adjusted under 35 U.S.C. 154(b) by 121 days.

(21) Appl. No.: 13/246,347

(22) Filed: Sep. 27, 2011

(65) Prior Publication Data

US 2012/0076087 A1    Mar. 29, 2012

(30) Foreign Application Priority Data

Sep. 27, 2010   (EP) .................................... 10180381

(51) Int. Cl.
*H04B 7/00*     (2006.01)
*H04W 4/00*    (2009.01)

(52) U.S. Cl.
USPC ............ 370/310; 370/329; 455/509; 455/513

(58) Field of Classification Search
USPC ......... 375/267; 370/310, 329, 332; 455/101, 455/450, 451, 452.1, 509, 513
See application file for complete search history.

(56) References Cited

U.S. PATENT DOCUMENTS

2005/0113041 A1   5/2005   Polley et al.
2010/0081467 A1   4/2010   Alex et al.

OTHER PUBLICATIONS

European Search Report and Written Opinion dated Apr. 15, 2011 for corresponding European Application No. EP 10 18 0381, filed Sep. 27, 2010.
Xiaolong Zhu et al., "2-D Switching Diversity Aided Collaborative Spatial Multiplexing for Uplink Wireless Access" Wireless Communications and Networking Conference, 2009. WCNC 2009. IEEE, IEEE, Piscataway, NJ, USA, Apr. 5, 2009, pp. 1-4, XP031453980.

*Primary Examiner* — Kwang B Yao
*Assistant Examiner* — Adam Duda
(74) *Attorney, Agent, or Firm* — David D. Bush; Westman, Champlin & Kelly, P.A.

(57) ABSTRACT

A method and apparatus are provided for allocating and transmitting groups of subcarriers, called tiles, between a plurality of transceiver antennas. The method includes receiving at least one downlink signal by a subscriber station transceiver through at least one of the plurality of subscriber station antennas, characterizing a received signal of at least one downlink signal over multiple subcarriers, and allocating tiles for uplink transmission through at least one of the plurality of transceiver antennas. The tiles allocation is based on the characterized received signal of the at least one downlink signal over multiple subcarriers and is based on a required power Ptx for uplink transmission compared with a maximum power P that each of the plurality of the transceiver antennas can emit.

16 Claims, 1 Drawing Sheet pilot carrier      data carrier

TILE ALLOCATION METHOD

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure relates to data transmission techniques.

More particularly, the disclosure relates to data transmission techniques on the uplink channel of OFDM transmission systems. Such systems comprise some base stations and some mobile stations, also called subscribers stations. The disclosure proposes a method for allocating and transmitting groups of subcarriers, called tiles, between a plurality of transceiver antennas.

BACKGROUND OF THE DISCLOSURE

Several diversity transmission techniques have been developed in the past both for the downlink (DL) and for the uplink (UL) of OFDM systems. Actually the most well-known ones are:

1. The switched diversity technique, which requires a single transmitter (TX) chain in the UL and therefore only one power amplifier. This technique offers good performance in slowly varying environments in which deciding in favor of one antenna among two makes sense. On the other hand, in fast varying environments, it is of no interest since the decision of the best antenna that is done on the DL signal is no longer valid when it is time to send the UL signal.
2. The "two transmission tile allocation", which requires two transmission chains but is transparent to the receiver. This technique consists in sending each group of subcarriers (called tiles in Wimax) from the best Tx antenna (the choice is based on the observation of the channel obtained in the DL in order to optimize performance) and an exact attribution of the tiles to the best antenna, which is a quite long operation. This kind of techniques that consist in distributing the subcarriers on several Tx antennas actually is a well-known technique that appears in many other patents.
3. The "Cyclic Delay Diversity (CDD)", which requires two transmission chains but is transparent to the receiver. This technique is extensively used in Wimax in the downlink channel.
4. The Alamouti scheme (also known as STC) which also requires two Tx chains and offers improved performance compared to CDD but requires a special decoder to be implemented at the receiver side.

In addition to the need for one or two transmission chains and to the need for a special decoder at the receiver side, another important criterion to compare different systems is the maximum transmit power available on the single transmission chain or on each of the two transmission chains. In the following, we use the triplet (Diversity scheme, PTX1, PTX2) to represent a system, where PTX1 (resp. PTX2) denotes the maximum transmit power of the first (resp. second) transmission chain.

Actually, when comparing the performance of transmission schemes in a real context (WiMAX system with convolutional coding and real channel), it turns out that the performance of (Switched diversity, 2P, 0) significantly outperforms the performance of (CDD, P, P) and (STC, P, P) in slowly varying environment in which the antenna choice can be done reliably.

On the other hand, (CDD, 2P, 2P) and (STC, 2P, 2P) clearly work better than (Switched, 2P, 0) but is much more costly.

Then (two transmission tile allocation, P, P) outperforms (Switched diversity, 2P, 0) in most of the cases except when the antenna imbalance is high.

When antenna imbalance is higher than 8 dB, (CDD, P, P) is better than (two transmission tile allocation, P, P) and almost equivalent to (Switched diversity, P, 0).

The general concept of two transmission tile allocation is already known in the literature as "clustered OFDM". In the case of two antennas, it consists in sending the first half of the subcarriers on the first antenna and the second half on a second antenna according to a fixed pattern (typically the transmit antenna is changing every X subcarriers).

Instead of applying a fixed and deterministic pattern, a very general and well known technique consists in choosing the transmission antenna every X subcarriers based on the knowledge of the channel acquired in the DL of a TDD system. Such a technique can be found US patent application 2005/0113041 called "Frequency domain subchannel transmit antenna selection and power pouring for multi-antenna transmission".

SUMMARY

An aspect of the disclosure relates to a method for allocating and transmitting tiles. More specifically, this aspect relates to a method of a subscriber station transceiver allocating and transmitting groups of subcarriers, called tiles, between a plurality of transceiver antennas, comprising:

the subscriber station transceiver receiving at least one downlink signal through at least one of the plurality of subscriber station antennas;

the subscriber station transceiver characterizing a received signal of at least one downlink signal over multiple subcarriers;

the subscriber station transceiver allocating tiles for uplink transmission through at least one of the plurality of transceiver antennas.

The tile allocation is based on the characterized received signal of the at least one downlink signal over multiple subcarriers and is based on a required power Ptx for uplink transmission compared with a maximum power P that each of the plurality of said transceiver antennas can emit.

In a specific embodiment, when said required power Ptx is smaller or equal to said maximum power P, said allocation comprises determining the best transmission antenna among said plurality of transceiver antennas, for transmitting all the tiles of the uplink transmission.

In a specific embodiment, Method as claimed in claim 1, characterized in that, when said required power Ptx is greater than said maximum power P, said allocation comprises:

determining whether tiles should be equally distributed on each antenna of the plurality of transceiver antennas;

and, when said tiles should be equally distributed, determining a preferred antenna for each tile, among said plurality of said transceiver antennas by:

calculating a metric Mj for each tile where 1≦j≦N and N is the total number of tiles to transmit, delivering a set of N metrics;

calculating at least one estimated median value $m_m$ over a subset of said set of N metrics;

equally distributing each tile by:
- calculating a difference $d_j$ of said metric $m_j$ of a given tile with said at least one estimated median value $m_m$;
- comparing said difference $d_j$ to a predefined threshold T and;
- distributing said tile to a preferred antenna in view of said previous comparison and in view of a load factor LFi for said preferred antenna, 1≦i≦I and I is the total number of antennas, said load factor LFi indicating whether all possible tiles have said already been attributed to said preferred antenna.

In a specific embodiment, characterized in that said step for determining whether tiles should be equally distributed on each antenna of the plurality of transceiver antennas consists in comparing said required power Ptx to said maximum power of an antenna P multiplied by the number of said plurality of transceiver antennas I and deciding that tiles have to be equally distributed on each antenna when Ptx=P·I;

In a specific embodiment, when said required power Ptx is greater than said maximum power P, said allocation comprises:
- determining whether tiles should be equally distributed on each antenna of the plurality of transceiver antennas;
and, when said tiles do not have to be equally distributed, determining a preferred antenna for each tile, among said plurality of said transceiver antennas by:
- calculating a metric Mj for each tile where 1≦j≦N and N is the total number of tiles to transmit, delivering a set of N metrics;
- calculating at least one median value $M_m$ over at least a subset of said set of N metrics;
- distributing each tile by comparing metric $M_j$ of a given tile with said at least one median value $M_m$;
- refining the obtained distribution in view of an asymmetrical splitting factor α and/or an average imbalance level δ.

In a specific embodiment, said refining comprises reallocating at least one tile;

In a specific embodiment, said refining comprises boosting a transmission power on at least one antenna to which has been allocated the smallest number of tiles.

In a specific embodiment, said asymmetrical splitting factor α is defined by $$\alpha = \frac{P \cdot I}{PTx}$$

where P is the maximum power of an antenna and I is the number of transceiver antennas.

In a specific embodiment, median value $m_m$ is an estimated median value calculated with Quickselect algorithm.

In a specific embodiment, said step for determining whether tiles do not have to be equally distributed on each antenna of the plurality of transceiver antennas consists in comparing said required power Ptx to said maximum power of an antenna P multiplied by the number of said plurality of transceiver antennas I and deciding that tiles do not have to be equally distributed on each antenna when Ptx≦P·I.

In a specific embodiment, said allocation comprises, previously to determining whether tiles should be equally distributed on each antenna of the plurality of transceiver antennas, a step of determining an average imbalance level δ by checking a received power on at least one received frame and characterised in that said allocation comprises a step for determining whether a switch diversity technique has to be employed by comparing said an average imbalance level δ to a predefined threshold T'.

In a specific embodiment, when switch diversity technique has to be employed, said method comprises a step for allocating at least one subset of said tiles on a first antenna and remaining tiles on a second antenna, so that the resulting signals are orthogonal one with another and uniquely need to be summed before being emitted.

In a specific embodiment, when said total number of antennas I is equal to two, said metric Mj for a given tile tj is equal to:

$$m_j = 10 \cdot \log_{10}(P_{jRx1}) - 10 \cdot \log_{10}(P_{jRx2})$$

where:
$P_{jRx1}$ is the power of tile $t_j$ on antenna 1;
$P_{jRx2}$ is the power of tile $t_j$ on antenna 2;

by using this metric instead of other metric in which a simple difference is made between received powers, the method ensures that a tile will not be attributed to an antenna on which there is no power.

An aspect of the disclosure relates to a subscriber station transceiver comprising means for allocating and transmitting groups of subcarriers, called tiles, between a plurality of transceiver antennas, comprising:
- means for receiving at least one downlink signal through at least one of the plurality of subscriber station antennas;
- means for characterizing a received signal of the at least one downlink signal over multiple subcarriers;
- means for allocating tiles for uplink transmission through at least one of the plurality of transceiver antennas.

According to an aspect of the disclosure, the tiles allocation is based on the characterized received signal of the at least one downlink signal over multiple subcarriers and is based on a required power Ptx for uplink transmission compared with a maximum power P that each of the plurality of said transceiver antennas can emit.

An aspect of the disclosure also relates to a computer program product downloadable from a communications network and/or stored on a computer readable medium and/or executed by a microprocessor.

The computer program product includes instructions of program code for implementing the allocation and transmission method when run on a computer.

BRIEF DESCRIPTION OF THE DRAWINGS

The proposed method is described in the following by way of examples in connection with the accompanying figures without limiting the scope of the protection as defined by the claim. The figures show:

DETAILED DESCRIPTION OF ILLUSTRATIVE EMBODIMENTS

MAIN FEATURES OF AN ILLUSTRATIVE EMBODIMENT

An exemplary aspect of the disclosure proposes a tile allocation scheme in which the allocation between the antennas takes into account the antenna imbalance which enables to improve significantly the system performance.

Figure 1:
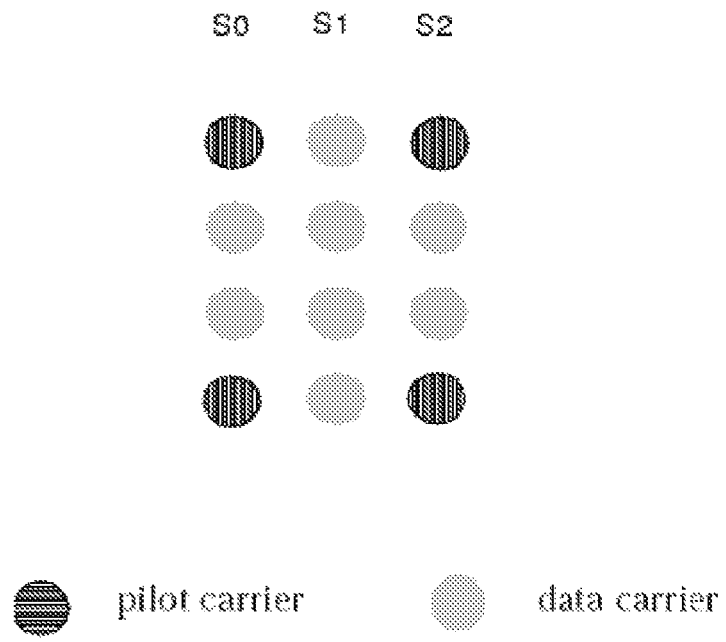
FIG. 1 represents a tile in the WIMAX standard.

A tile, in the WiMAX standard, is a group of four subcarriers that span over three OFDMA symbols as shown in FIG. 1.

Thus, the tile allocation between the transmission antennas is not only based on the configuration of the MIMO channels as in the classical methods but is also done:

1 depending on the ratio between the powers that the BS is requesting the MS to transmit and the maximal power available per transmit antennas.
2 depending on the measured degree of average power imbalance between the 2 antennas In some extreme cases (large imbalance or very bad channel), the solution of this disclosure solution can eventually end up allocating all tiles to the same antenna as in simple switched diversity if this is the best for performance.

The disclosure also suggests a practical and new implementation of the two transmission tile allocation as well as a new metric to be used to decide on which antenna to send the tile. On top of that, the disclosure extended the case without antenna imbalance to more than two transmission antennas.

The non-symmetrical allocation of the tiles makes the (two transmission tile allocation, P1, P2) handle even higher antenna imbalance and postponed the switch to the other technique (Switched diversity, 2P, 0).

As already told, the disclosure also describes a way to switch efficiently from one diversity technique to another and thereby make an efficient use of two transmit chains. The disclosure also refines the two transmission tile allocation technique, optimizing it to compensate for antenna imbalance.

It is also proposed another optimization that consists in boosting the subcarriers that are sent from the antenna with the lowest number of subcarriers. The latter optimization is not currently compatible with the WiMAX profile, but it actually brings lots of improvement and it is transparent to the base station.

SPECIFIC EXEMPLARY EMBODIMENT

For presenting this embodiment, let's define the following expressions:

PTx is the transmit power that is requested by the base station (BS) and that the subscriber needs to transmit;
P is the total available transmission power for each antenna. Lets assume that there is the same available transmit power for both antennas so $P_{max}$=I·P, where I is the number of antennas of the subscriber;
Pi the actual transmit power at antenna i (Pi<=P);
So $$P_{Tx} = \sum_I P_i$$

where I is the number of antennas of the subscriber.
Rx power is the receive power measured in the DL (downlink signal)
Psd is the power spectral density i.e. the power per subcarrier Lets also assume that it is always possible to reach the power requested by the BS, that is to say PTx<=I.P.

The method of the disclosure comprises the following steps:

1. Detecting if P≧PTx

This means that all the subcarriers can actually be transmitted from a single antenna if, for example, there is antenna imbalance.

In this case, a non-symmetrical split across antennas is allowed and each tile is sent from its actual best antenna. The best antenna is selected as follows:

First a metric per tile is computed (the metric to be used is described further below),
then if M>0, the tile is attributed on antenna #1;
else, the tile is attributed on antenna #2.

In this case, the tile allocation can easily be extended to more than two antennas. For each tile, the best transmission antenna is checked by comparing the Rx powers of all antennas. Then the tile is allocated on the antenna with the highest Rx power.

2. Else if P<PTx

Lets assume that in this case, P=αPTx, with 0.5≦α≦1.

This means that all of the antennas are really needed to reach the transmit power requested by the base station, so non-symmetrical split can not easily be authorized anymore.

Let us call N the total number of tiles to be sent. It is not allowed sending more than αN tiles from one antenna if the assumption is taken that all the tiles will be sent with the same Psd.

1. Same Number of Tiles on Each Tx Antenna (Symmetrical Allocation)

1.1. Tile Allocation

Since all antennas have the same available output power (P), a very simple tile allocation is to force half of the tiles on one antenna and the other half on the other antenna.

Here, since it may not be able to place each tile on its preferred antenna, the tiles are sort according to their metric M from the highest to the lowest. The first half of the tiles will be sent from antenna #1 and the second half from antenna #2.

The fact that the tiles are allocated in halves allows to actually avoid sorting them entirely and simply find the median value of the metrics set which eases the implementation since a median search is far less costly in terms of processing than sorting values.

Then for each tile j (1≦j≦N), its metric Mj is checked. If Mj>median, the tile is allocated on antenna 1 otherwise, the tile is allocated on antenna 2.

The main advantage of this technique is that it is not required to compute the median on all the metric set. It is highly efficient to estimate the median value (Med_est) over a subset of metrics M to reduce the complexity of the median search.

The problem of this technique is that since the value Med_est obtained is only an estimation of the median, it is not sure that there are exactly half of the tiles with a metric higher than Med_est. Therefore, the tile allocation is not as simple as before. Thus, a two passes algorithm is employed and a predefined threshold T is used.

1. All the tiles are processed for a first allocation occurrence:
   a. If Mj>Med_est+T, the tile is allocated on antenna #1, if the antenna #1 is not already full,
   b. Otherwise, if Mj<Med_est−T, the tile is allocated on antenna #2, if antenna #2 is not already full, The threshold value T is previously chosen by simulations according to the size of the subset of metrics used to estimate the median value. This first allocation occurrence ensures that all the tiles that have a high metric (positive or negative) are allocated on there preferred antenna.

2. Remaining tiles are processed for a second occurrence and allocated as follows:

a. if Mj>Med_est allocate the tile on antenna #1 if it is not full otherwise allocate it on antenna #2
b. if Mj<Med_est allocate the tile on antenna #2 if not full otherwise allocate it on antenna #1

In this second allocation occurrence, the remaining tiles have metrics quite close to the median value and allocating them on one antenna or the other will not change much the performances.

1.2. Metric Computation

One important feature disclosed is the way the metrics M are computed for each tile. Indeed, previous solutions are based on the calculation of a difference between the received powers ($P_{Rx1}$, $P_{Rx2}$) on the plurality of antennas of the subscriber's station. In other words, in ordinary solution, a metric $Mj=Pj_{Rx1}-Pj_{Rx2}$ is calculated.

This ordinary calculation does not ensure that a tile will not be allocated to an antenna on which there is no power even if the power of the other antenna is not much higher.

In the present disclosure, the metric calculation, the metric M is calculated as the ratio between both Rx powers ($m_j=10 \cdot \log_{10})-10 \cdot \log_{10}(P_{jRx1})-10 \cdot \log_{10}(P_{jRx2})$ or $$m_j = \frac{P_{jRx1}}{P_{jRx2}})$$

and not as the difference between the Rx powers ($m_j=P_{jRx1}-P_{jRx2}$). Thus, this ensures that a tile will not be allocated from an antenna on which there is no power even if the power of the other antenna is not much higher. If both powers are quite high and equivalent, it is accepted to allocate the tile from its less preferred antenna.

2. Asymmetrical Allocation: a First Improvement

The previous method is improved with a more flexible split since it is possible to send up to $\alpha N$ tiles from a single antenna.

In this first improvement, a non-symmetrical allocation is allowed even if both antennas have the same transmit power because most of the time PTx<2·P.

In that case (PTx<2·P), the allocation on both antennas is done as follows:
1. First, all the tiles are sorted out according to their metric M, from the highest to the lowest;
2. All tiles with a metric M>0 are allocated to antenna #1 and all the others are allocated on antenna #2.
3. If the number of tiles on antenna #1 is higher than $\alpha N$ then, the tiles with the lowest metric (M close to 0) are switch to antenna #2.
4. In the same way, if the number of tiles allocated on antenna #1 is lower than $(1-\alpha)N$ then, the tiles with the lowest metric on antenna #2 are switch to antenna #1.

This procedure can be extended to more than two antennas. The description below is general and supports both symmetrical and asymmetrical tile allocation. The case where the same number of tiles is "forced" on each antenna (symmetrical) is a particular case of this example with $\alpha=1/I$ First each tile is allocated on its preferred antenna without taking any constraint into account by implementing the following steps:
1. for each tiles all the metrics Mij are computed:

$M_{ij}=10 \cdot \log_{10}(P_{Rxi})-10 \cdot \log_{10}(P_{Rxj})$ with $i>j$ 2. then a calculation is done for finding the max value for a given tile $M_{kl}=\max_{i,j}(|M_{ij}|)$ 3. if $M_{kl}>0$, the tile is allocated on antenna #k, otherwise it is allocated on antenna #1.

Then a check is done for verifying if all antennas have less than their maximum number of tiles allocated. If not, the global allocation is adjusted:
1. Let's call Ni the number of tiles allocated on antenna i.
2. If $N_k=\max_i(N_i) > \alpha N$, the following metrics are computed for all the tiles allocated on this antenna k:

$M_{kj}=10 \cdot \log_{10}(P_{Rxk})-10 \cdot \log_{10}(P_{Rxj})$ for $j \neq k$

3. Each tile is assigned to a metric $M_j=\min_{j \neq k}(M_{kj})$ and all tiles are sorted according to this metric from the lowest to the highest.
4. Then the $N_k-\alpha N$ tiles are switched with the lowest $M_j$ to antenna j.
5. This way, it is ensured that the tiles that did not have a huge preference for antenna k compared to antenna j have moved.
6. Then one starts over from step 2 excluding this time the case of antenna k that we just handled.

2. Asymmetrical Allocation with Antenna Imbalance: a Second Improvement

The system performance can be further optimized by considering the average imbalance level δ, which can be taken into account. δ is measured by averaging the difference between the Rx power of the two receiving antenna over several frames.

In a first time, a description of the case for two transmission antennas is given. In a second time, the improvement is generalized to a plurality of transmission antennas.

In the case of two antennas, if antenna #1 is X dB higher than antenna #2 where $X=10 \cdot \log_{10}(P_{Rx1})-10 \cdot \log_{10}(P_{Rx2})$, then a non-symmetric allocation is used.

$$\left(\frac{10^{\frac{X}{10}}}{1+10^{\frac{X}{10}}}\right) \cdot N$$

tiles are allocated to antenna #1 and $$\left(\frac{1}{1+10^{\frac{X}{10}}}\right) \cdot N$$

tiles are allocated to antenna #2.

The tiles are allocated as follows:
1. First, the tiles are sorted according to their metric value:
a. from the highest to the lowest if antenna #1 is the strongest antenna (that is to say the antenna with the highest Rx power),
b. From the lowest to the highest if antenna #2 is the strongest one.
2. Then the first $$\left(\frac{10^{\frac{X}{10}}}{1+10^{\frac{X}{10}}}\right) \cdot N$$

tiles are allocated to the strongest antenna,

3. The last $$\left(\frac{1}{1+10^{\frac{X}{10}}}\right)\cdot N \qquad 5$$

tiles are allocated to the weakest antenna.

This solution is compliant with the constraint (imposed by WIMAX) of sending all the tiles using the same Psd as long as $$\left(\frac{10^{\frac{X}{10}}}{1+10^{\frac{X}{10}}}\right) \leq \alpha,$$

otherwise, the $P_{Tx}$ required by the Base Station, will not be reached.

An important feature is that even if $$\left(\frac{10^{\frac{X}{10}}}{1+10^{\frac{X}{10}}}\right) > \alpha,$$

according to this disclosure, the allocation is still being performed as explained above. This means that, if the tiles are not transmitted with the same Psd, the required average Psd will not be reached. Indeed, as there are more tiles allocated on one antenna than $\alpha N$, the Psd per tile is lower than the required Psd.

Thus, the appropriate correction which is given by the an exemplary method of the disclosure consists in boosting the power on the antenna with the smallest number of tiles (since the total available power is not reached for this antenna) in order to reach the transmit power requested by the base station.

However, this technique gives a non-flat spectrum which is not authorized by the WiMAX standard but which is totally transparent to the base station.

This technique can extend to more than two transmission antennas.

First each tile is allocated on its preferred antenna without taking any constraint into account as explained above.

Then, if $N_k = \max_i (N_i) > \alpha N$, there is no need to change initial allocation.

Otherwise, a boosting is applied on the antennas with the lowest number of tiles allocated. If $N_k = \max_i (N_i) > \alpha N$, then if $Psd_k \cdot N > P_{Tx}$, an extra power is available. This extra available power is equally split between the other antennas: $P_{Tx} - Psd_k \cdot N$. If applying this extra power makes another antenna overcome its maximum available power Pi then the additional extra power is equally split between the other antennas and so on.

On top of this improvement made for the two transmission tile allocation technique, a switch is added between the two transmission tile allocation and tile switch diversity technique. This switch is based on the antenna imbalance between both Rx antennas.

For detecting the antenna imbalance level $\delta$, the average received power of each Rx antenna over several frames is checked.

3. Other Features and Advantages

The method object of the disclosure has been generally described. Other improvements are proposed among which:

a combination with a usage of switch diversity, an improved algorithm for tile allocation with continuous shift from two transmission tile allocation to switch diversity, an improvement of switch diversity by using both power amplifiers (Pas).

Theses improvements are presented in details.

3.1. Combination with a Usage of Switch Diversity.

Instead of basically detecting the antennas imbalances and applying the previous technique, this improvement consist in comparing the antenna imbalance with a threshold T' for deciding of the most appropriated transmission technique to apply.

Thus, if the antenna imbalance is greater than a threshold T', the "CDD" technique is used and all the tiles are sent from two antennas. The switch diversity technique can also be used, which is almost equivalent and requires only one power amplifier.

Else, if the antenna imbalance is lower than the threshold T', the two transmission tile allocation technique of this disclosure is used, and the tile allocation is done according to the previous presented method.

The threshold value T' is obtained by simulations. It has been set to the imbalance value above which (Switched diversity, P, 0) starts outperforming (two transmission tile allocation, P, P). The value is typically set to 8 dB if no boost of the tiles is done on the second antenna and to 10 dB if a boost of the tiles on the second antenna is done.

In some other particular cases, it is important to fallback to the switch diversity technique which uses only one PA even though the antenna imbalance is lower than the threshold T':

when the CINR (Carrier to Interference plus Noise Ratio) is very high and there is no real advantage in using two transmission tile allocation.

when the temperature of the MS is really high: to ensure the user's safety and avoid damaging the device when the battery level is really low and if having only one PA on enables decreasing the power consumption when we need to limit the interference generated over another technique co-localised in frequency (in case of WIFI/MIMAX device for example). The out of band noise generated by one PA does not depend on its power. However, using 2 PA will double the out of band noise generated.

3.2. Improved Algorithm for Tile Allocation with Continuous Shift from Two Transmission Tile Allocation to Switch Diversity.

It is possible to improve this tile allocation between two transmission antennas using the following algorithm. Let's assume that $P = \alpha \cdot P_{Tx}$ with $0.5 \leq \alpha \leq 1$.

Let's deal first with a constraint of constant Psd.

According to the tile split we choose, in order to be able to reach the required $P_{Tx}$, one have: $P_1 = \beta \cdot P_{Tx}$ with $1-\alpha \leq \beta \leq \alpha$ and $P_2 = P_{Tx} - P_1$.

Let's call $n_1$ and $n_2$ the number of tiles on antenna #1 and #2 respectively, we have $$\beta = \frac{n_1}{N},$$

so $N \cdot (1-\alpha) \leq n_1 \leq N \cdot \alpha$. In this case the Psd per tile will be equal to $$\frac{P_{Tx}}{N}.$$

If we have $n_1 \succ N \cdot \alpha$ or $n_1 \succ N \cdot (1-\alpha)$, we will not reach the required $P_{Tx}$ anymore and the Psd per tile will depend on n1, $$Psd = \frac{P}{n_1}$$

if $n_1 \succ N \cdot \alpha$ or $$Psd = \frac{P}{N - n_1}$$

if $n_1 \succ N \cdot (1-\alpha)$.

1. First we sort all the metric Mj of the tiles from the highest to the lowest, let's call j the index of the tile in this list.
2. for each $n_1$ such as $N \cdot (1-\alpha) \leq n_1 \leq N \cdot \alpha$, the following values are computed $$G(n_1) = \sum_{j=0}^{n_1-1} M_j \cdot \frac{P_{Tx}}{N} - \sum_{j=n_1}^{N-1} M_j \cdot \frac{P_{Tx}}{N}$$

3. for $N \cdot \alpha \succ n_1 \leq N$, the following values are computed $$G(n_1) = \sum_{j=0}^{n_1-1} M_j \cdot \frac{P}{n_1} - \sum_{j=n_1}^{N-1} M_j \cdot \frac{P}{n_1}$$

4. for $0 \leq n_1 \succ N \cdot (1-\alpha)$, the following values are computed $$G(n_1) = \sum_{j=0}^{n_1-1} M_j \cdot \frac{P}{N-n_1} - \sum_{j=n_1}^{N-1} M_j \cdot \frac{P}{N-n_1}$$

5. We choose $n_{1\_max}$ such as $n_{1\_max} = \max_{0 \leq n_1 \leq N} G(n_1)$ This algorithm enables switching continuously from the two transmission tile allocation of the disclosure, to the switch diversity technique. This means that the transmission is adapted continuously, in view of the mobility conditions of the transceiver. This is a huge progress, because by eliminating the brutality of a change of a transmission scheme, the method enables a progressive switching, which is more efficient in terms of data transmission.

If we do not take the constraint of a constant Psd into account, we can actually change the value G to be computed in steps 3 and 4 described above as follow:

3b. For $N \cdot \alpha \succ n_1 \leq N$, the following values are computed $$G(n_1) = \sum_{j=0}^{n_1-1} M_j \cdot \frac{P}{n_1} - \sum_{j=n_1}^{N-1} M_j \cdot \frac{P_{Tx} - P}{N - n_1}$$

4b. For $0 \leq n_1 \succ N \cdot (1-\alpha)$, the following values are computed $$G(n_1) = \sum_{j=0}^{n_1-1} M_j \cdot \frac{P_{Tx} - P}{n_1} - \sum_{j=n_1}^{N-1} M_j \cdot \frac{P}{N - n_1}$$

The next step does not change and we choose $n_{1\_max}$ such as $n_{1\_max} = \max_{0 \leq n_1 \leq N} G(n_1)$.

3.3. Improvement of Switch Diversity by Using Both Power Amplifiers.

When a switch on one antenna only is decided (see two previous algorithms), the inventors have had the idea to manage to use both Power Amplifiers (PAs) for avoid decreasing the maximum available power.

Traditionally, it is mandatory to sum both PAs in phase to avoid destructive summation. Summing signal coming from two different PAs in phase requires a very accurate calibration to ensure that both paths before the hybrid coupler are totally symmetrical.

A simple way of ensuring that both signals will be correctly summed up is make them orthogonal by sending half of the tiles through the first PA and the other half through the other PA.

Figure 2:
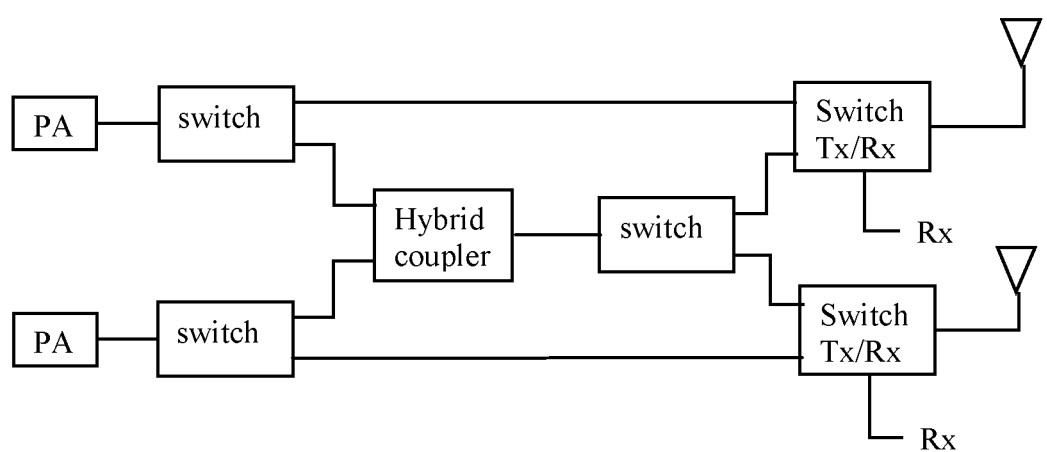
FIG. 2 represents an architecture of a subscriber station transceiver in one embodiment.

FIG. 2 shows an example of architecture of a subscriber station transceiver that is capable of using both PAs and sends the signal on one antenna only.

In this embodiment, the value of the threshold T' defined in section 5.3.1 is changed. It should be set to the imbalance value above which (Switched diversity, 2·P, 0) starts outperforming (two transmission tile allocation, P, P) which is typically around 5 dB imbalance between both antenna.

One limitation should be noticed here: the different switch elements and the hybrid coupler of the subscriber station transceiver (of FIG. 2) add insertion loss to the signal and the output total power will not be exactly 2·P anymore but around 2·P−1.5 dB.

In the same way, in this embodiment, the improved tile allocation algorithm described in section 5.3.2 is changed.

When all the tiles are allocated on a single antenna, the available total power is actually 2·P (instead of P previously). Steps 1, 2 and 5 are unchanged. Steps 3, 4, 3bis and 4bis should be changed as follows:

3. for $N \cdot \alpha \succ n_1 \succ N$, the following values are computed $$G(n_1) = \sum_{j=0}^{n_1-1} M_j \cdot \frac{P}{n_1} - \sum_{j=n_1}^{N-1} M_j \cdot \frac{P}{n_1} \text{ and } G(N) = \sum_{j=0}^{N-1} M_j \cdot \frac{P_{Tx}}{N}$$

4. for $0 \succ n_1 \succ N \cdot (1-\alpha)$, the following values are computed $$G(n_1) = \sum_{j=0}^{n_1-1} M_j \cdot \frac{P}{N - n_1} - \sum_{j=n_1}^{N-1} M_j \cdot \frac{P}{N - n_1}$$

and $$G(0) = -\sum_{j=0}^{N-1} M_j \cdot \frac{P_{Tx}}{N}$$

3bis. For $N \cdot \alpha > n_1 > N$, the following values are computed $$G(n_1) = \sum_{j=0}^{n_1-1} M_j \cdot \frac{P}{n_1} - \sum_{j=n_1}^{N-1} M_j \cdot \frac{P_{Tx} - P}{N - n_1}$$

and $$G(N) = \sum_{j=0}^{N-1} M_j \cdot \frac{P_{Tx}}{N}$$

4bis. For $0 > n_1 > N \cdot (1-\alpha)$, the following values are computed $$G(n_1) = \sum_{j=0}^{n_1-1} M_j \cdot \frac{P_{Tx} - P}{n_1} - \sum_{j=n_1}^{N-1} M_j \cdot \frac{P}{N - n_1}$$

and $$G(0) = -\sum_{j=0}^{N-1} M_j \cdot \frac{P_{Tx}}{N}$$

Thus, with this improvement, it is possible to use all the power amplifier of the subscriber station transceiver without having the drawbacks of the prior art solutions. Indeed, by orthogonally spreading the tiles between the two transmission paths, one can easily sum the two signals from the PA without having to synchronize their phase.

Although the present disclosure has been described with reference to one or more examples, workers skilled in the art will recognize that changes may be made in form and detail without departing from the scope of the disclosure and/or the appended claims.

The invention claimed is:

1. A method of a subscriber station transceiver allocating and transmitting groups of subcarriers, called tiles, between a plurality of transceiver antennas, comprising:
   the subscriber station transceiver receiving at least one downlink signal through at least one of the plurality of transceiver antennas;
   the subscriber station transceiver characterizing a received signal of at least one downlink signal over multiple subcarriers, by calculating at least one metric; and
   the subscriber station transceiver allocating tiles for uplink transmission through at least one of the plurality of transceiver antennas, wherein allocating tiles is based on the characterized received signal of the at least one downlink signal over multiple subcarriers and is based on a required power Ptx for uplink transmission compared with a maximum power P that each of the plurality of said transceiver antennas can emit.

2. The method as claimed in claim 1, wherein, when said required power Ptx is smaller or equal to said maximum power P, said allocating comprises determining the best transmission antenna among said plurality of transceiver antennas, for transmitting all the tiles of the uplink transmission.

3. The method as claimed in claim 1, wherein, when said required power Ptx is greater than said maximum power P, said allocating comprises:
   determining whether tiles should be equally distributed on each antenna of the plurality of transceiver antennas;
   and, when said tiles should be equally distributed, determining a preferred antenna for each tile, among said plurality of said transceiver antennas by:
   calculating a metric Mj for each tile where $1 \leq j \leq N$ and N is the total number of tiles to transmit, delivering a set of N metrics;
   calculating at least one estimated median value $m_m$ over a subset of said set of N metrics;
   equally distributing each tile by:
      calculating a difference $d_j$ of said metric $m_j$ of a given tile with said at least one estimated median value $m_m$;
      comparing said difference $d_j$ to a predefined threshold T; and
      distributing said tile to a preferred antenna in view of said previous comparison and in view of a load factor LFi for said preferred antenna, $1 \leq i \leq I$ and I is the total number of antennas, said load factor LFi indicating whether all possible tiles have already been attributed to said preferred antenna.

4. The method as claimed in claim 3, wherein said step of determining whether tiles should be equally distributed on each antenna of the plurality of transceiver antennas comprises comparing said required power Ptx to said maximum power of an antenna P multiplied by the number of said plurality of transceiver antennas I and deciding that tiles have to be equally distributed on each antenna when $Ptx = P \cdot I$.

5. The method as claimed in claim 1, wherein, when said required power Ptx is greater than said maximum power P, said allocating comprises:
   determining whether tiles should be equally distributed on each antenna of the plurality of transceiver antennas;
   and, when said tiles do not have to be equally distributed, determining a preferred antenna for each tile, among said plurality of said transceiver antennas by:
   calculating a metric Mj for each tile where $1 \leq j \leq N$ and N is the total number of tiles to transmit, delivering a set of N metrics;
   calculating at least one median value $M_m$ over at least a subset of said set of N metrics;
   distributing each tile by comparing metric $M_j$ of a given tile with said at least one median value $M_m$; and
   refining the obtained distribution in view of at least one of an asymmetrical splitting factor $\alpha$ or an average imbalance level $\delta$.

6. The method as claimed in claim 5, wherein, when said total number of antennas I is equal to two, said metric Mj for a given tile tj is equal to:

$$m_j = 10 \cdot \log_{10}(P_{jRx1}) - 10 \cdot \log_{10}(P_{jRx2})$$

where:
   $P_{jRx1}$ is the power of tile $t_j$ on antenna 1;
   $P_{jRx2}$ is the power of tile $t_j$ on antenna 2.

7. The method as claimed in claim 5, wherein said refining comprises reallocating at least one tile.

8. The method as claimed in claim 7 wherein said refining comprises boosting a transmission power on at least one antenna to which has been allocated the smallest number of tiles.

9. The method as claimed in claim 5, wherein said asymmetrical splitting factor $\alpha$ is defined by $$\alpha = \frac{P \cdot I}{PTx}$$

where P is the maximum power of an antenna and I is the number of transceiver antennas.

10. The method as claimed in claim 5, wherein said median value $m_m$ is an estimated median value calculated with a Quickselect algorithm.

11. The method as claimed in claim 5, wherein said step of determining whether tiles do not have to be equally distributed on each antenna of the plurality of transceiver antennas comprises comparing said required power Ptx to said maximum power of an antenna P multiplied by the number of said plurality of transceiver antennas I and deciding that tiles do not have to be equally distributed on each antenna when Ptx≦P·I.

12. The method as claimed in claim 5, wherein said allocating comprises, previously to determining whether tiles should be equally distributed on each antenna of the plurality of transceiver antennas, a step of determining an average imbalance level δ by checking a received power on at least one received frame, and wherein said allocating comprises a step of determining whether a switch diversity technique has to be employed by comparing said an average imbalance level δ to a predefined threshold T'.

13. The method as claimed in claim 12, wherein, when switch diversity technique has to be employed, said method comprises a step of allocating at least one subset of said tiles on a first antenna and remaining tiles on a second antenna, so that the resulting signals are orthogonal one with another and uniquely need to be summed before being emitted.

14. The method as claimed in claim 3, wherein, when said total number of antennas I is equal to two, said metric Mj for a given tile tj is equal to:

$$m_j = 10 \cdot \log_{10}(P_{jRx1}) - 10 \cdot \log_{10}(P_{jRx2})$$

where:
 $P_{jRx1}$ is the power of tile $t_j$ on antenna 1;
 $P_{jRx2}$ is the power of tile $t_j$ on antenna 2.

15. A subscriber station transceiver comprising means for allocating and transmitting groups of subcarriers, called tiles, between a plurality of transceiver antennas, comprising:

means for receiving at least one downlink signal through at least one of the plurality of subscriber station antennas;

means for characterizing a received signal of the at least one downlink signal over multiple subcarriers, by calculating at least one metric;

means for allocating tiles for uplink transmission through at least one of the plurality of transceiver antennas, allocating the tiles is based on the characterized received signal of the at least one downlink signal over multiple subcarriers and is based on a required power Ptx for uplink transmission compared with a maximum power P that each of the plurality of said transceiver antennas can emit.

16. A computer program product stored on a non-transitory computer readable medium wherein the product includes instructions of program code for implementing a method of allocating and transmitting groups of subcarriers, called tiles, between a plurality of transceiver antennas, when run on a computer, wherein the method comprises:

a subscriber station transceiver receiving at least one downlink signal through at least one of the plurality of transceiver antennas;

the subscriber station transceiver characterizing a received signal of at least one downlink signal over multiple subcarriers, by calculating at least one metric; and the subscriber station transceiver allocating tiles for uplink transmission through at least one of the plurality of transceiver antennas, wherein allocating tiles is based on the characterized received signal of the at least one downlink signal over multiple subcarriers and is based on a required power Ptx for uplink transmission compared with a maximum power P that each of the plurality of said transceiver antennas can emit.

* * * * *